United States Patent
Saravanan et al.

(10) Patent No.: US 11,269,656 B2
(45) Date of Patent: Mar. 8, 2022

(54) METHOD AND DEVICE FOR SETTING OPERATING SYSTEM

(71) Applicant: Samsung Electronics Co., Ltd., Suwon-si (KR)

(72) Inventors: Karthikeyan Saravanan, Staines (GB); Daniel Ansorregui Lobete, Staines (GB); James Bantock, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/762,639

(22) PCT Filed: Nov. 30, 2018

(86) PCT No.: PCT/KR2018/015077
§ 371 (c)(1),
(2) Date: May 8, 2020

(87) PCT Pub. No.: WO2019/108011
PCT Pub. Date: Jun. 6, 2019

(65) Prior Publication Data
US 2020/0278870 A1 Sep. 3, 2020

(30) Foreign Application Priority Data

Nov. 30, 2017 (GB) .................................. 1719945.6
Nov. 28, 2018 (KR) ........................ 10-2018-0150095

(51) Int. Cl.
*G06F 15/177* (2006.01)
*G06F 9/00* (2006.01)
(Continued)

(52) U.S. Cl.
CPC .............. *G06F 9/441* (2013.01); *G06F 9/505* (2013.01); *G06F 11/3466* (2013.01); *G06F 2209/5022* (2013.01)

(58) Field of Classification Search
CPC ...... G06F 9/441; G06F 9/505; G06F 11/3466; G06F 2209/5022; G06F 9/44505;
(Continued)

(56) References Cited

U.S. PATENT DOCUMENTS

2002/0116441 A1    8/2002  Ding et al.
2005/0021530 A1*   1/2005  Garg ..................... G06F 9/505
(Continued)

FOREIGN PATENT DOCUMENTS

EP    2 759 907 A1    7/2014
WO   2009158280 A1   12/2009

OTHER PUBLICATIONS

Great Britain Office Action dated May 18, 2018, issued in Great Britain Application No. GB1719945.6.
(Continued)

*Primary Examiner* — Xuxing Chen
(74) *Attorney, Agent, or Firm* — Jefferson IP Law, LLP

(57) ABSTRACT

A method of setting operating system parameters of a device includes: identifying, based on execution of an application, at least one workload type for the application; generating a workload-specific policy corresponding to the at least one workload type; and setting the operating system parameters based on the workload-specific policy.

15 Claims, 13 Drawing Sheets

(51) Int. Cl.
*G06F 9/4401* (2018.01)
*G06F 9/50* (2006.01)
*G06F 11/34* (2006.01)

(58) Field of Classification Search
CPC .... G06F 9/4401; G06F 1/3206; G06F 1/3203; Y02D 10/00
See application file for complete search history.

(56) References Cited

U.S. PATENT DOCUMENTS

| | | |
|---|---|---|
| 2005/0132371 A1 | 6/2005 | Lopez-Estrada |
| 2008/0271038 A1 | 10/2008 | Rolia et al. |
| 2009/0089554 A1 | 4/2009 | Blackmon et al. |
| 2009/0112931 A1 | 4/2009 | Wang et al. |
| 2009/0210360 A1 | 8/2009 | Sankar et al. |
| 2013/0132973 A1 | 5/2013 | Gargash et al. |
| 2014/0181487 A1 | 6/2014 | Sasanka |
| 2015/0309552 A1 | 10/2015 | Vanka et al. |
| 2016/0224381 A1 | 8/2016 | Farhan et al. |
| 2016/0239074 A1* | 8/2016 | Lee .................. G06F 9/50 |
| 2016/0335737 A1 | 11/2016 | Shah et al. |
| 2017/0109205 A1 | 4/2017 | Ahuja et al. |
| 2017/0242472 A1 | 8/2017 | Morad |
| 2017/0286282 A1 | 10/2017 | Simpson et al. |
| 2018/0336473 A1* | 11/2018 | Sardino .............. G06F 16/254 |

OTHER PUBLICATIONS

Great Britain Search Report dated May 17, 2018, issued in Great Britain Application No. GB1719945.6.
International Search Report dated Mar. 13, 2019, issued in International Application No. PCT/KR2018/015077.
Great Britain Search Report dated May 11, 2020, issued in Great Britain Application No. 1719945.6.
Extended European Search Report dated Oct. 26, 2020, issued in European Application No. 18883142.4.
European Office Action dated Dec. 23, 2021, issued in European Application No. 18883142.4.

* cited by examiner

ID_656 B2

METHOD AND DEVICE FOR SETTING OPERATING SYSTEM

TECHNICAL FIELD

The present disclosure relates to an operating system, and more particularly, to a method and device for setting an operating system to provide a service smoothly.

BACKGROUND ART

An operating system (OS) refers to a program that controls hardware and software of an electronic device including a computer to enable a user to use the electronic device. The OS may act as an interface between hardware and applications to manage computer resources such as a central processing unit (CPU), a main memory, and an input/output (I/O) device. The electronic device may execute various types of OSs. For example, the electronic device may execute Android, Tizen, Windows, iOS, MacOS, or the like.

Moreover, the OS may include parameters that define internal operations of the electronic device. While an application is running on the electronic device, an operation of the electronic device may be controlled based on the parameters of the OS.

DESCRIPTION OF EMBODIMENTS

Technical Problem

Provided are a method and device for setting an operating system so that the operating system may provide a service smoothly.

Solution to Problem

According to some embodiments of the present disclosure, a method of setting operating system parameters of a device includes: identifying, based on execution of an application, at least one workload type for the application; generating a workload-specific policy corresponding to the at least one workload type; and setting the operating system parameters based on the workload-specific policy.

Advantageous Effects of Disclosure

According to the disclosed embodiment, a service may be provided smoothly via setting of parameters of an operating system.

BRIEF DESCRIPTION OF DRAWINGS

The present disclosure will be easily understood from the following description taken in conjunction with the accompanying drawings in which reference numerals denote structural elements.

BEST MODE

Figure 1:
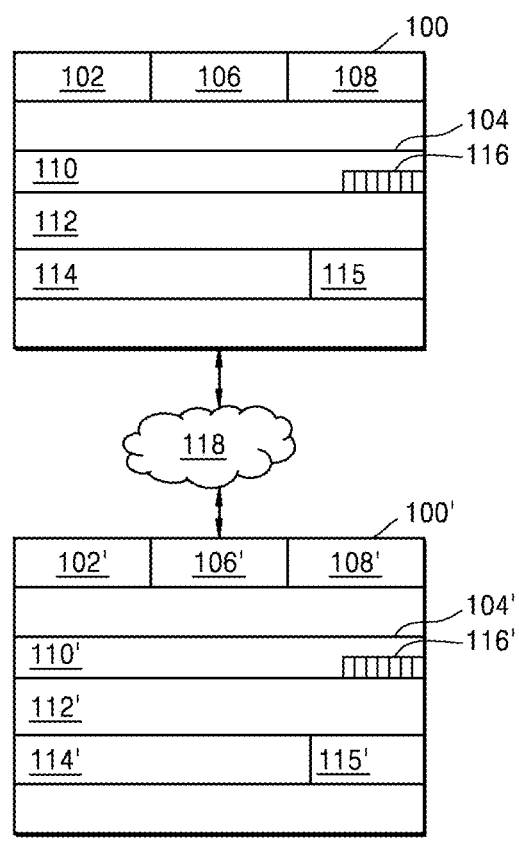
FIG. 1 is a block diagram of a computer according to an embodiment.

According to some embodiments of the present disclosure, a method of setting operating system parameters of a device includes: identifying, based on execution of an application, at least one workload type for the application; generating a workload-specific policy corresponding to the at least one workload type; and setting the operating system parameters based on the workload-specific policy.

According to some embodiments, the identifying of the at least one workload type may include: recording at least one metric of the device while the application is being executed; and identifying the at least one workload type based on the recorded at least one metric.

According to some embodiments of the present disclosure, a device operating based on an operating system includes: a memory storing one or more instructions and an application; and a processor configured to execute the one or more instructions to: identify, based on execution of the application, at least one workload type for the application; generate a workload-specific policy corresponding to the at least one workload type; and set operating system parameters based on the workload-specific policy.

Mode of Disclosure

Embodiments of the disclosure will be described more fully with reference to the accompanying drawings. Furthermore, a method of constructing and using an electronic device, according to an embodiment of the disclosure, will be described in detail with reference to the accompanying drawings. In the drawings, like reference numerals or symbols refer to like components or elements performing substantially the same functions.

Although the terms including an ordinal number such as "first", "second", etc. may be used herein to describe various elements or components, these elements or components should not be limited by the terms. The terms are only used to distinguish one element or component from another element or component. For example, a first element or component to be discussed below may be termed a second element or component without departing from the scope of the present disclosure, and similarly, a second element or component may be termed a first element or component. As used herein, the term "and/or" includes any and all combinations of one or more of the associated listed items.

The terminology used herein is for the purpose of describing embodiments of the disclosure only and is not intended to limit the present disclosure. As used herein, singular forms are intended to include plural forms as well, unless the context clearly indicates otherwise. It will be further understood that the terms "comprises" and/or "includes", when used in this specification, specify the presence of stated features, integers, steps, operations, elements, components, or combinations thereof, but do not preclude the presence or addition of one or more other features, integers, steps, operations, elements, components, or combinations thereof.

In the present disclosure, an operating system of an electronic device including a computer may expose parameters that define internal operations of the electronic device within system software algorithms. According to an embodiment of the present disclosure, parameters of an operating system may include parameters related to a timer duration, a decision threshold, and a range of operation. According to an embodiment, these parameters may be tuned to improve or change the performance of a system operating the electronic device. For example, the parameters may be set to specific values or may be modified in a certain manner (e.g., increased or decreased). For example, the parameters may be tuned to degrade the system performance in order to save power consumed by the electronic device.

As a result of executing a software application, the computer may experience one or more types of software workloads. The order in which these types of software workloads are executed may be deterministic or stochastic based on an external input. Moreover, the optimal setting of operating system parameters may be based on a software workload type being executed at a given time. While an application is being executed, software workload types may have various behaviors, and new workload types representing unexpected behaviors may be executed.

For general types of software applications such as game applications, a predetermined set of operating system parameters may be provided. However, settings of parameters for these general types of software applications may not be optimized for individual applications, and may not be dynamically generated or updated based on actual usage of a specific application. Furthermore, these parameters may not be optimized among applications or within applications (inter- and intra-application tuning).

Thus, when individual workloads in a software application are executed or experienced, tuning of operating system parameters is required to optimize or at least improve performance of a device. However, tuning operating system parameters for known software workload types may be challenging because it requires search of a vast state space for selecting parameters. For example, in various situations, the volume of executable software applications or logistical constraints may prevent workload types of applications from being individually characterized, and the operating system may be tuned accordingly.

A policy may be a policy instructing how to tune at least one of parameters of an operating system. In the above-described situations, when an optimal tuning policy is desired, a search for each optimal policy may be performed after deployment to a target computing device. However, searching for a tuning policy as described above in a production environment may cause various problems due to the variance of performance caused by a search for a wrong policy choice.

An embodiment of the present disclosure is directed to solving at least one of the above-described problems. In an embodiment, operating system parameters during execution of a software application may be set or tuned in a production environment. According to an embodiment, a method of the present disclosure may involve separating a software application into one or more individual software workloads.

The method according to the present disclosure may provide a parameter tuning policy for an individual software workload. According to an embodiment, the parameter tuning policy for the individual software workload may be bootstrapped by imitating a generic policy. According to an embodiment, the generic policy may be static or dynamic.

The method of the present disclosure may involve performing a refinement process for searching for an incremental improvement to an initial policy, and the refinement process may be supervised by the generic policy for stability of production.

According to an embodiment, a method of setting parameters of an operating system may include identifying at least one workload type produced by executing an application on a computer and generating a workload-specific policy for the identified at least one workload type. In this case, when the computer is in a particular state corresponding to the identified workload type as a result of executing the application, the workload-specific policy may include at least one rule for setting a parameter of the operating system.

According to an embodiment, the method of the present disclosure may further include, when the application is executed on the same or a different computer, applying the workload-specific policy to set at least one parameter of the operating system. According to an embodiment, the computer on which the application is executed may be in a state included in the workload-specific policy.

According to an embodiment, a method of identifying the at least one workload type according to the present disclosure may include: recording a plurality of metrics for a computer while the application is being executed for a predetermined time period; and identifying the at least one workload type based on at least some of the plurality of metrics.

In an embodiment, the identifying of the at least one workload type based on the at least some of the plurality of metrics according to the disclosure may include identifying a relationship between at least two of the metrics observed during a particular timeframe. In this case, the at least two of the metrics may include metrics experiencing the same type of change or having identical or similar values (e.g., identical or similar maximum, average, or minimum values). In an embodiment, the same type of change may include a case where the metrics exceed a predetermined threshold or a case where they increase or decrease by the same or similar amount.

According to an embodiment, the method of the present disclosure may further include applying a filtering technique (e.g., an exponential weighted mode) to at least some of the plurality of metrics. In an embodiment, the identifying of the at least one workload type based on the at least some of the plurality of metrics according to the disclosure may include identifying the workload type by applying a clustering technique to the filtered metrics. For example, the clustering technique may include density-based spatial clustering of applications with noise (DBSCAN) or a k-means algorithm. However, in the present disclosure, a technique used to identify the workload type is not limited to the above-described examples, and it will be fully understood by those of ordinary skill in the art that various techniques or algorithms other than partitioning or clustering may be used for this identification.

According to an embodiment, the metrics may include average frames per second (FPS), central processing unit (CPU) utilization, graphics processing unit (GPU) utilization, a CPU frequency, a GPU frequency, a BUS frequency, a user input, etc. Furthermore, the workload type may include a video play mode in the application or a change of a game scene.

In an embodiment, a method of generating the workload-specific policy for the identified at least one workload type according to the disclosure may include initially applying a generic policy during execution of the identified at least one workload type in order to set the parameters of the operating system of the computer running the application. The generic policy may include, when the computer operates under general usage as a result of executing the application, at least one rule for setting a parameter of the operating system when the computer is in a specific state under the general usage. In this case, the specific state in the generic policy does not need to be produced intentionally to correspond to the identified workload type. Furthermore, the method according to the disclosure may include modifying the generic policy and generating a workload-specific policy by using the modified generic policy.

In an embodiment, the modifying of the generic policy according to the present disclosure may include using an imitation learning technique. In this case, the imitation learning technique may include active or passive learning. According to an embodiment, when it is determined that applying a modified generic policy does not lead to unacceptable performance degradation compared to applying the generic policy, the workload-specific policy may be generated using the modified generic policy, In this case, whether applying the modified generic policy will lead to the unacceptable performance degradation may be determined by comparing a performance score calculated based on the modified generic policy with a predetermined threshold. The method according to the disclosure may further include setting parameters of the operating system of the computer when executing the application by using the generated workload-specific policy instead of the generic policy.

According to an embodiment, the method of the disclosure may further include refining the generated workload-specific policy. The refining of the generated workload-specific policy may be achieved using an optimization technique such as a policy iteration technique.

In an embodiment, the refining of the generated workload-specific policy according to the present disclosure may include comparing performance when the workload-specific policy is applied during execution of the application with performance when the generic policy is applied. In this case, the method of the present disclosure include transforming the performance for each case into a score and compare the performances for both cases with each other based on their corresponding scores.

According to an embodiment, when it is determined, based on a comparison result, that applying the workload-specific policy exhibits unsatisfactory performance compared to applying the generic policy, the method of the present disclosure may include applying the generic policy instead of the workload-specific policy to set the parameters when executing the application. On the other hand, when it is determined, based on the comparison result, that applying the workload-specific policy exhibits satisfactory performance compared to applying the generic policy, the method of the present disclosure may include restarting identifying at least one workload type produced by executing an application and/or generating a workload-specific policy for workload-specific policy for the identified at least one workload type.

According to another aspect of the present disclosure, a method may include: receiving the workload-specific policy generated using the above-described method; and using the workload-specific policy to set parameters of an operating system of a computer running an application.

According to an embodiment, the method of the present disclosure may include a method of generating policies for setting operating system parameters as described above.

According to another aspect of the present disclosure, a computer may include a processor configured to: identify at least one workload type produced by executing an application on the computer (or a different computer); and generate a workload-specific policy for the identified at least one workload type. According to an embodiment, when the computer is in a specific state corresponding to the identified workload type as a result of executing the application, the workload-specific policy may include at least one rule for setting a parameter of the operating system.

According to another aspect of the present disclosure, a computer may receive the workload-specific policy generated as described above and use the workload-specific policy to set parameters of an operating system of a computer running an application.

According to another aspect of the present disclosure, a method, device, and system for providing the present disclosure may be provided.

Specific embodiments of the present disclosure will be described below with reference to the accompanying drawings such that the disclosure may be fully understood.

FIG. 1 is a block diagram of a computer according to an embodiment. Referring to FIG. 1, a first computer 100 may include or communication with at least one processor 102, a storage 104, a user interface 106, and a communication unit 108 for communicating with other devices or computers. According to an embodiment, the storage 104 may be at least one internal memory, and the user interface 106 may be a display or an input unit including a touch screen. According to an embodiment, the communication unit 108 may communicate with the outside over a communication network such as the Internet, a wired or wireless connection, Bluetooth, or near field communication. According to an embodiment, the first computer 100 may include a mobile smartphone or tablet computer. However, this is merely an example,
and the computer according to the present disclosure is not limited thereto and may be provided as various other types of computing devices or electronic devices such as desktops, laptops, smart TVs, etc.

According to an embodiment, the storage 104 may include an operating system 110. For example, the operating system 110 may include Android, Tizen, iOS, Windows, or Unix, and types of the operating system 110 according to the present disclosure are not limited thereto. Furthermore, the storage 104 may include at least one software application 112. In the present disclosure, the software application may be any type of application such as a game, a word processor, social media, an email application, etc. Furthermore, it will be fully understood by those of ordinary skill in the art that the software application may be downloaded onto the first computer 100 in the form of an app from a remote source such as Google Play™. In addition, the storage 104 may further include an instruction/software 114 executable by the first computer and which can generate policies according to the present disclosure. According to an embodiment, at least one policy may be specific to types of workloads that the computer experiences when executing the software application 112. These workload-specific policies may be used to set parameters 116 of the operating system 110 in order to optimize or improve the performance of the computer when the first computer 100 executes the software application 112.

Moreover, referring to FIG. 1, the first computer 100 may communicate with a second computer 100'. FIG. 1 shows an example in which the first computer 100 communicates with the second computer 100' over the communication network 118. According to an embodiment, the second computer 100' may be of the same or different type as or from the first computer 100. For example, the second computer 100' may be a different type of Android smartphone produced by the same manufacturer as for the first computer 100.

In general, the underlying hardware blocks or behaviors of the first and second computers may be the same in terms of policy or learning to be applicable across different computers or operating systems. For example, a policy for one computer is applicable to another computer when they both share the same causal relationship between tuning of an operating system parameter and its effect on the hardware/software performance/power/temperature of the computer.

Like the first computer 100, the second computer 100' may include computer components such as a processor 102', a storage 104', a user interface 106', and a communication unit 108'. The storage 104' may include an operating system 110' and an application 112' respectively corresponding to the operating system 110 and the software application 112 of the first computer 100.

According to an embodiment, the operating system 110 and the software application 112 of the first computer 100 may be the same as the operating system 110' and the application 112' of the second computer 100', respectively. However, they may not be necessarily identical to each other, and may be of the same type with different versions or may be authenticated for use by different users or devices.

The software 114 for policy generation on the first computer 100 may generate at least one policy 115 for improving computer performance when the software application 112 is executed on any computer having the same or similar operating system. In this case, the generated at least one policy may be transmitted to the second computer 100' and stored in the storage 104'.

When the second computer 100' executes the application 112' independently of the first computer 100, the at least one policy may be used to set parameters 116' of the operating system 110' so that performance of the computer may be optimized or improved for types of workloads generated when the application 112' is executed on the second computer 100'. The storage 104' may include software instructions 114' executed in order to receive and apply the at least one policy 115. The at least one policy 115 may be received and stored by the second computer 100' according to a predetermined event, such as an event where the application is downloaded or installed on the second computer 100' or where the policy or application is updated, a user request, or a specific time interval (e.g., daily or weekly updates or checks).

It will be fully understood by those of ordinary skill in the art that the embodiment described with reference to FIG. 1 is merely an example, and embodiments of the present disclosure may have various forms. For example, there may be a plurality of computers that generate all or some of policies to be used for the same or different software applications. The plurality of computers may transmit the generated policies to at least one computer, e.g., a central server that stores and processes the policies and distributes them to the plurality of computers.

Figure 2:
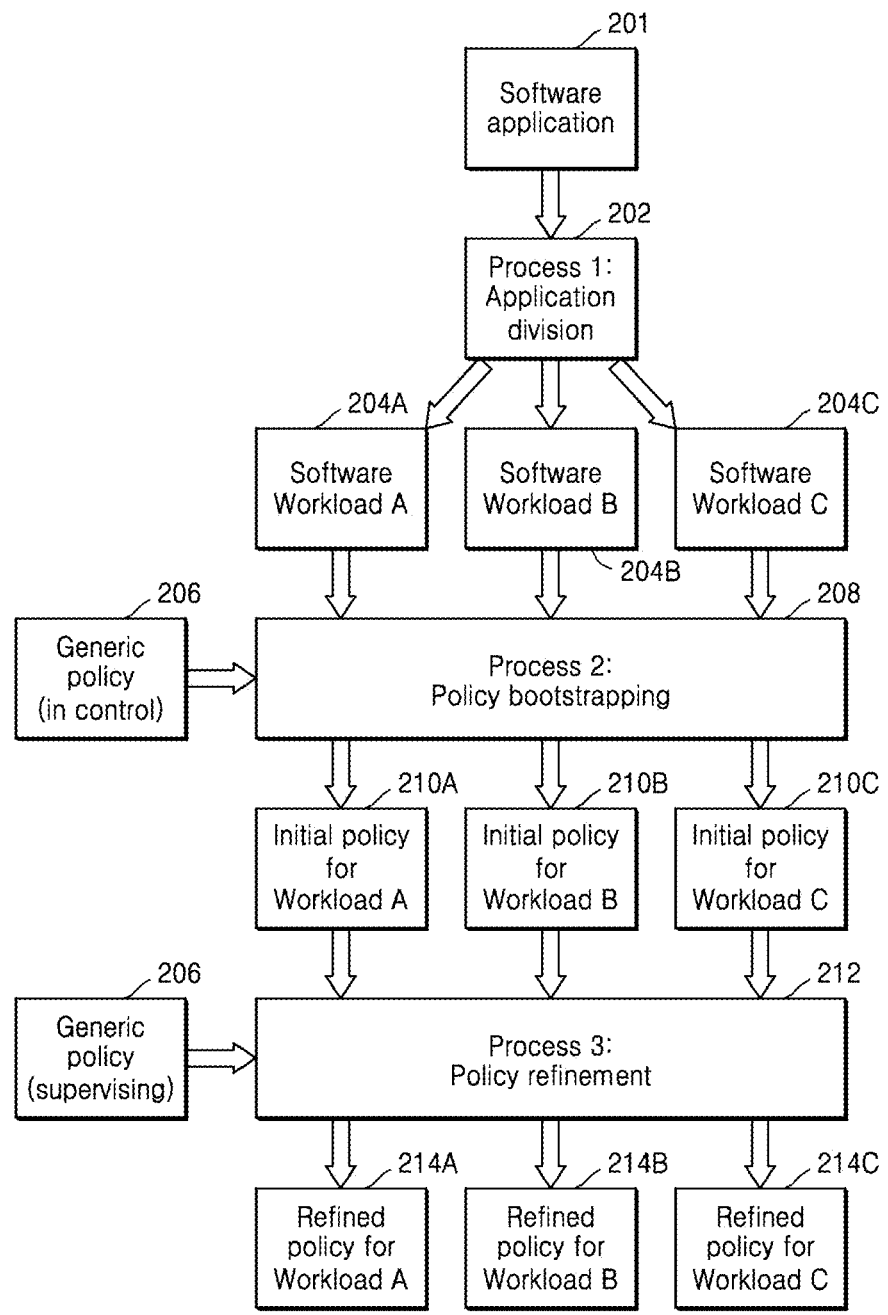
FIG. 2 is a flowchart illustrating an operation of a computer, according to an embodiment.

FIG. 2 is a flowchart illustrating an operation of a computer, according to an embodiment. In detail, FIG. 2 illustrates an operation of the instruction/software 114 for generating workload type-specific policies, according to an embodiment.

It will also be fully understood by those of ordinary skill in the art that at least one operation illustrated in FIG. 2 may be reordered, some of them may be omitted, and additional operations may be performed. Furthermore, although FIG. 2 shows that operations are sequentially performed, this is merely an example, and at least some of the operations may be performed simultaneously or in parallel. Furthermore, while computers performing each of the operations illustrated in FIG. 2 are merely examples, the present disclosure is not limited to an embodiment in which each of the operations is performed by a particular computer, and each operation may be distributed and performed over a plurality of physical or virtual computers.

For example, software 114 may be executed by at least one remote computers communicating with the first computer 100, but not by the first computer 100. The first computer 100 may monitor its own state and generate at least one policy while the at least one remote computers may monitor the state of the first computer 100 and generate at least one policy as the first computer executes the software application 112. Furthermore, the method of the present disclosure is not limited to types of data structures, programming languages, and tools and may be applied using any suitable means.

In operation 201, the software 114 may observe execution of the software application 112. According to an embodiment, the observation may include recording/monitoring changes in the state of the first computer 100 as the first computer 100 executes the software application 112. The changes in the state may be based on observable metrics, such as utilization of hardware resources (e.g., CPU cores, GPU cores, or memory bandwidth), application performance (e.g., frames rendered per second, time necessary for performing a function) and/or visual indicators (e.g., features of rendered videos or images). It will be understood that this is a non-exhaustive list of examples. However, it will be fully understood by those of ordinary skill in the art that the types of the metrics are merely examples and types of the metrics according to the present disclosure are not limited to the above-described examples.

Moreover, in operation 201, the software application 112 may be executed on the first computer 100 in a production environment where a test user interacts with the software application in a specific manner to test a particular feature/usage pattern. The execution of the software application may be under the control of an end user's computer in communication with or configured with the software 114. According to an embodiment, an execution observation period may vary across different times, e.g., from several seconds to several hours. Furthermore, a user's interaction may be at least partially predetermined/scripted and/or directed to a specific feature/usage pattern (e.g., as determined by a developer), or may be more flexible to emulate generally or commonly expected use of the application.

In operation 202, the instruction/software 114 may identify at least one specific type of workload being experienced by executing the software application 112 on the first computer 100. In other words, the instruction/software 114 may divide the software application 112 into at least one workload type. According to an embodiment, the software 114 may identify a type of a workload by analyzing the metrics observed during the execution of the software application in operation 201.

According to an embodiment, the analysis of the metrics may be performed simultaneously with or after the observation. Moreover, the analysis of the metrics may include identifying a relationship between at least two metrics observed during a particular timeframe, and the relationship between the at least two metrics may be indicative of the specific type of workload being experienced by the computer, e.g., the computer being in a particular state or in a sequence of states.

This relationship may mean that the at least two observed metrics experience a particular type of change (e.g., exceeding a predetermined threshold) or identical/similar values (e.g., a maximum, average or minimum value) during the same timeframe, which may indicate that the timeframe corresponds to the specific type of workload that the first computer 100 experiences as a result of executing the software application 112. According to an embodiment, although the analysis of the metrics may include an unsupervised learning process (e.g., clustering or partitioning), this is merely an example, and the technical features of the present disclosure may be implemented using other alternative methods such as decision trees or convolutional networks.

FIG. 2 shows an example in which the software 114 identifies three workload types, i.e., first through third workload types 204A, 204B, and 204C as a result of executing the software application 112 on the first computer 100.

For example, when the software application 112 is a game, the first workload type 204A may correspond to a change of a specific screen on a screen, the second workload type 204B may correspond to a change of another scene on the screen, and the third workload type 204C may correspond to a pop-up menu being displayed. As another example, when the application 112 includes a social media application such as Facebook, the identified workload types may include, for example, an "idle" workload when there is no user interaction in the application and a workload when the user opens a message window and starts to play a video contained in a message. However, it will be understood by those of ordinary skill in the art that the types of the application and the workload types corresponding thereto are merely examples and the present disclosure is applicable to different applications and various workload types to be identified therefor.

In operation 208, the software 114 may generate an initial policy for each of the identified workload type(s). Each initial policy may include, when a computer is in a specific state corresponding to an identified workload type, at least one rule for setting a parameter of an operating system (e.g., by setting the parameter to a particular value or changing it to increase or decrease via a particular operation) in order to improve or optimize performance of the computer when the computer encounters that workload type. For example, a policy may specify an operating system parameter in the form of an operating frequency of a processor to be set (e.g., by setting the operating frequency to a particular value, or changing it to increase or decrease via a particular operation) when the temperature of the processor reaches/exceeds a threshold value specified or calculated by the policy. Table 1 shows an example of a policy according to the present disclosure. As shown in Table 1, the policy may be represented using a variety of data structures and formats.

TABLE 1

| Device State | Rule |
|---|---|
| CPU utilization >80%; Operating frequency = 1000 MHz | If temperature >80° then change processor frequency Operating System parameter to 1500 MHz |

TABLE 1-continued

| Device State | Rule |
|---|---|
| CPU utilization <80%; Operating frequency <1000 MHz | If temperature >80° then increase processor frequency Operating System parameter by 250 Mhz |
| CPU Utilization >80, Frequency = 1500 Mhz. | Do nothing |
| CPU Utilization >90, Frequency = 1500 Mhz | Increase frequency |
| Temperature <30 C. | Do nothing |
| Temperature >50 C. | Set frequency to 1500 Mhz |
| Temperature >60 C. | Set frequency to 900 Mhz |

According to an embodiment, a simple initial policy for an individual software workload type may be generated using an existing generic policy 206. An operation of generating an initial policy based on the existing generic policy 206 may be performed using a supervised learning process such as passive or active imitation learning.

According to an embodiment, a generic policy determined by a developer may include at least one rule for setting an operating system parameter based on the current state of the computer and may be valid for general use of the computer (or may be valid when executing a particular class or genre of applications, such as a game, and in this case, the particular class or genre of applications does not mean a specific application).

In an embodiment, a generic policy may exist as a default policy of the operating system. Moreover, device states specified in the generic policy may not be produced to correspond to actual workload types encountered by a device when the application 112 is executed. Furthermore, rules in a generic policy may be more complex than those in a workload-specific policy. For example, the rules in the generic policy may be associated with more combinations of parameters/variables. In detail, unlike a workload-specific policy including only a small number of parameters associated therewith, e.g., only one parameter, but not other parameters that are not applied to its case, generic policies are extremely complicated because they have a plurality of or composite parameters. For example, a user Interface workload-specific policy may not take temperature-related parameters into account because the experience of a user interface workload does not cause the device to emit heat. Thus, as described above, a generic policy or algorithm is applicable to all general applications and not for a specific application or set of specific applications.

For example, a generic policy may specify that if device temperature >"X" then set frequency to "Y" while if temperature >"X+10" then set frequency to "Y−1". In an embodiment, the generic policy is applicable to parameters of a device regardless of a workload or application currently being executed. On the other hand, for example, a workload-specific policy may specify that if temperature >"X+10" then set frequency to "Y−2" instead of "Y−1", but this is only applicable when a specific workload in question is being executed. A rule corresponding to another workload (generated by the same or different application) may specify that if temperature >"X+10" then "do nothing". A generic policy may be a default value or an algorithm or settings existing on any operating system.

Although it is possible to generate/search for an initial policy without any underlying information, a variance experienced while searching for the initial policy may cause significant performance degradation, and thus, it may be preferable to generate an initial workload-specific policy based on the generic policy 206.

According to an embodiment, passive imitation learning may be used to develop the workload-specific policy via observation of decisions made by the generic policy when the computer experiences a particular software workload type. These decisions by the generic policy may be compared with decisions to be made by the current individual workload-specific policy. For example, similarity of actions to be taken by the policies under the same input may be compared. This optimization process may reduce a difference between the policies, e.g., by training the workload-specific policy to make the same decisions as the generic policy (or as the original system that is the basis of the generic policy).

According to an embodiment, only when the difference between the policies is below a predetermined threshold (e.g., as set by the developer), an individual workload type initial policy may be declared to be suitable for controlling the operating system parameters and be output as an initial policy 210. In general, the predetermined threshold may be determined based on a sensitivity of a system. For example, for very critical systems, a policy exhibiting an efficiency of 99.99% during run time may be required while for less critical systems, an appropriate efficiency of 95% may be sufficient. Thus, according to an embodiment, during operation 208, the generic policy 206 may be used to actually set operating system parameters even when one or more identified workload types are produced. Alternatively, the initial policy may be generated using a reinforcement learning system or various other types of machine learning systems instead of imitation learning.

In operation 212, the software 114 may refine initial workload-specific policies to generate refined workload-specific policies 214A through 214C. When a simple initial policy for each individual software workload type is output and is declared to be suitable for controlling the operating system parameters, the initial policy may be separated from the generic policy 206 as an improved performance result.

According to an embodiment, the refinement process may be implemented via an iterative approach using reinforcement learning, where iterations are performed over values to which operating system parameters are set based on the current state of the computer, to reduce a variance that may cause performance degradation. Supervision of a search process may be performed with reference to both an expected result under the individual workload-specific policy 210 and an expected result under the generic policy 206. When all differences exceed a threshold (e.g., as set by the developer), control over operating system parameters may be switched back to the generic policy, and a recovery process may be initiated. According to an embodiment, the recovery process may be performed by choosing to reset individual policies via bootstrapping (e.g., returning to operation 208), choosing to continuously use the generic policy for the individual workload, or dividing again the software application 112 into separate workloads to restart (e.g., return to operation 202).

Figure 3:
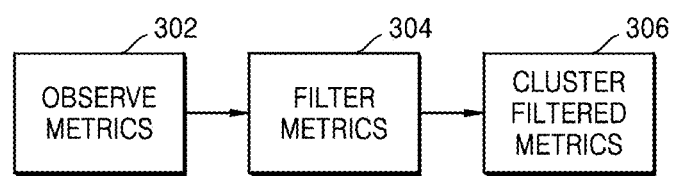
FIG. 3 is a flowchart illustrating a method of identifying a workload according to an embodiment.

FIG. 3 is a flowchart illustrating a method of identifying a workload according to an embodiment. In detail, FIG. 3 illustrates the workload identification operation according to an embodiment, which is performed by the software 114 in operation 202.

In operation 302, the software 114 may load all or some of the metrics observed in operation 201. The software may select all or some of the metrics for analysis, such as only metrics recorded during a specific part of the observation period.

Figure 4A:
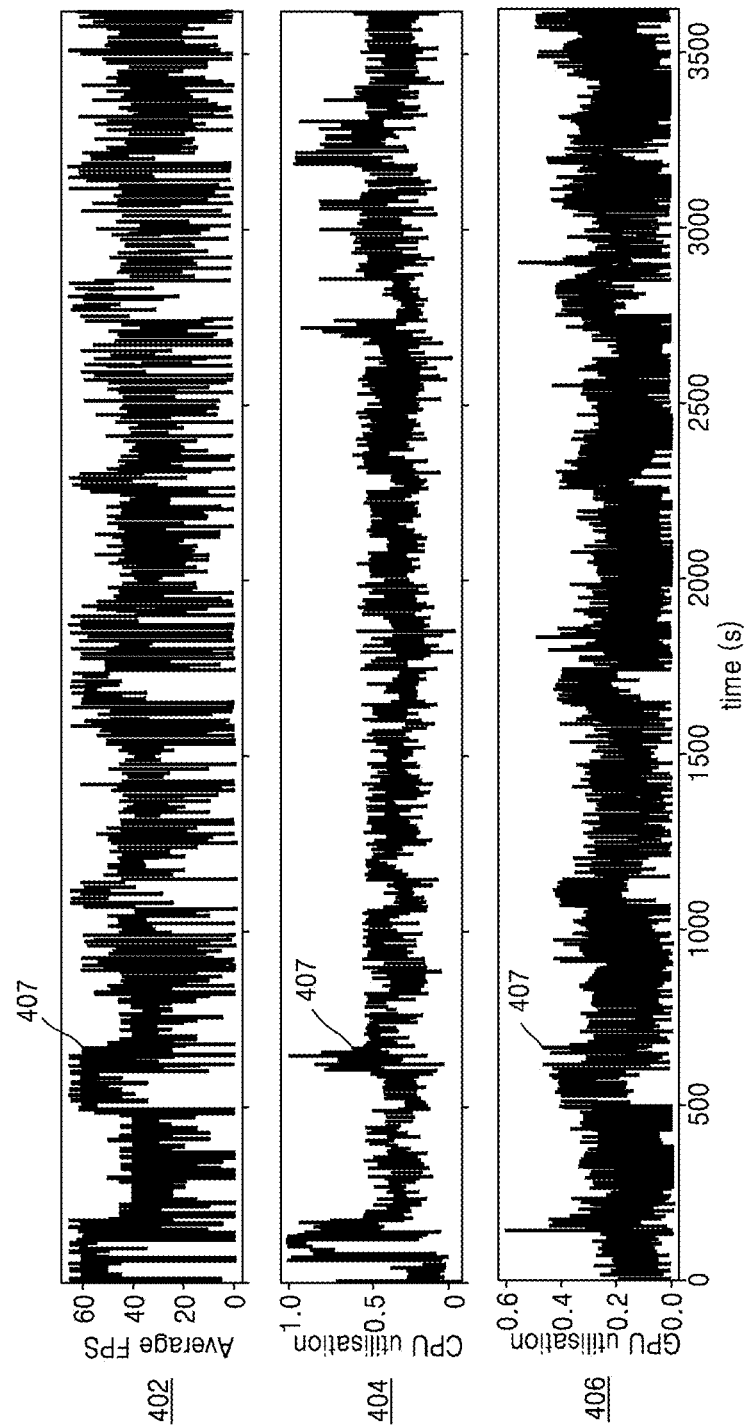
FIGS. 4A through 4D are diagrams illustrating a workload identification method according to an embodiment.

FIG. 4A graphically illustrates examples of three metrics observed during a 1-hour usage session in an example application. Referring to FIG. 4A, example raw data representing metrics are respectively shown in the form of average FPS 402, CPU utilization 404, and GPU utilization 406 (on the y-axis in a graph) that are recorded during a 1-hour period (on the x-axis in the graph) based on usage of an example game application Lineage 2 for the Android™ platform. A human analyst may identify changes in the raw data (e.g., portions 407 of the graph) that correspond to specific workload types based on game scene changes, despite the presence of noise.

In operation 304, the software 114 may filter the metrics loaded in operation 302. In this case, the filtering operation is not essential and may be optionally performed.

Figure 4B:
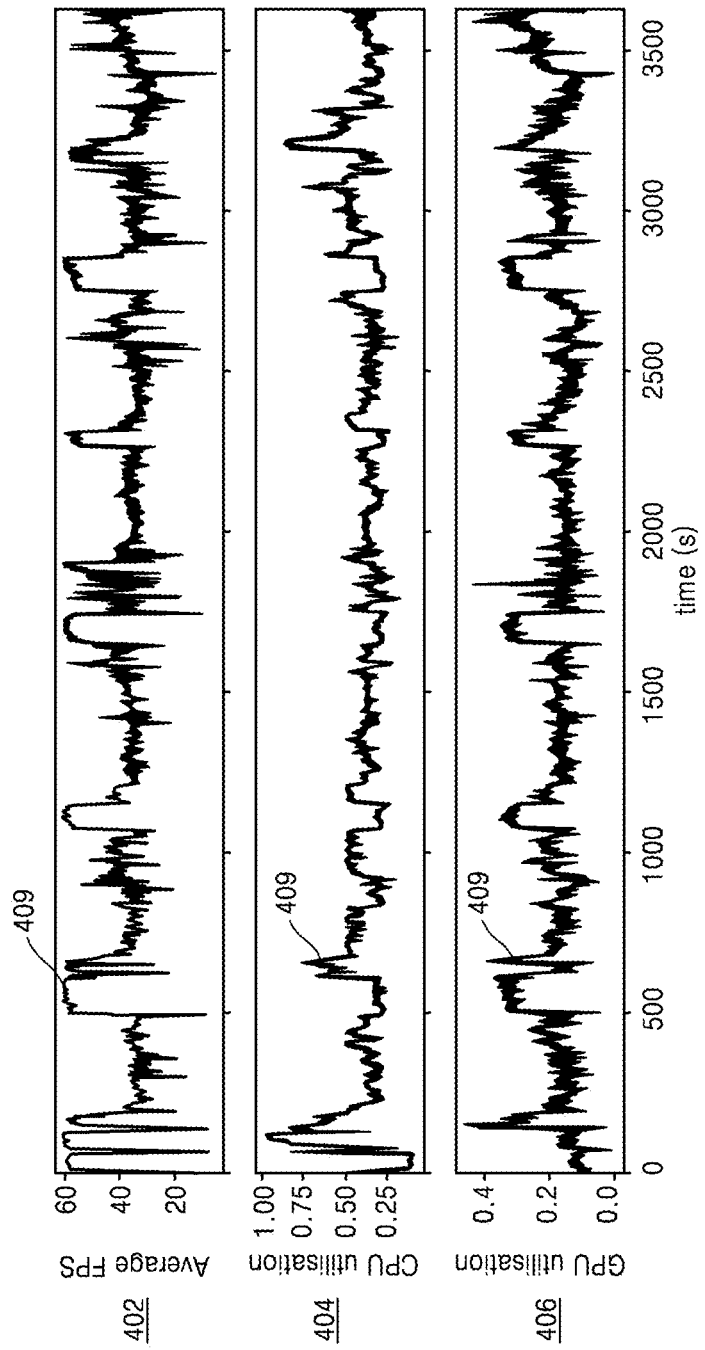

FIG. 4B graphically illustrates results of applying an exponentially weighted mean window function to the raw data representing the three metrics of FIG. 4A. This type of data transformation may be selected to suit a specific machine learning logic used for operation, and it will be fully understood by those of ordinary skill in the art that a different type of filtering operation than exponentially weighted window mean window filtering or no filtering may be performed. In general, the filtering may be performed based on data transformation required for specific implementation of the machine learning logic or the type of data acquired from the operating system. The human analyst may clearly identify changes in the raw data (e.g., portions 409 of the graph) that correspond to game scene changes and activation of pop-up menu.

In operation 306, the software 114 may process the metric data (that may have been filtered) in order to identify at least one different workload type experienced by the computer 100 while the software application 112 is being executed. According to an embodiment, such an operation may be performed based on DBSCAN, k-means, or other clustering techniques. However, this is merely an example, and the technical features of the present disclosure may be implemented using other alternative methods such as decision trees or convolutional networks.

Figure 4C:
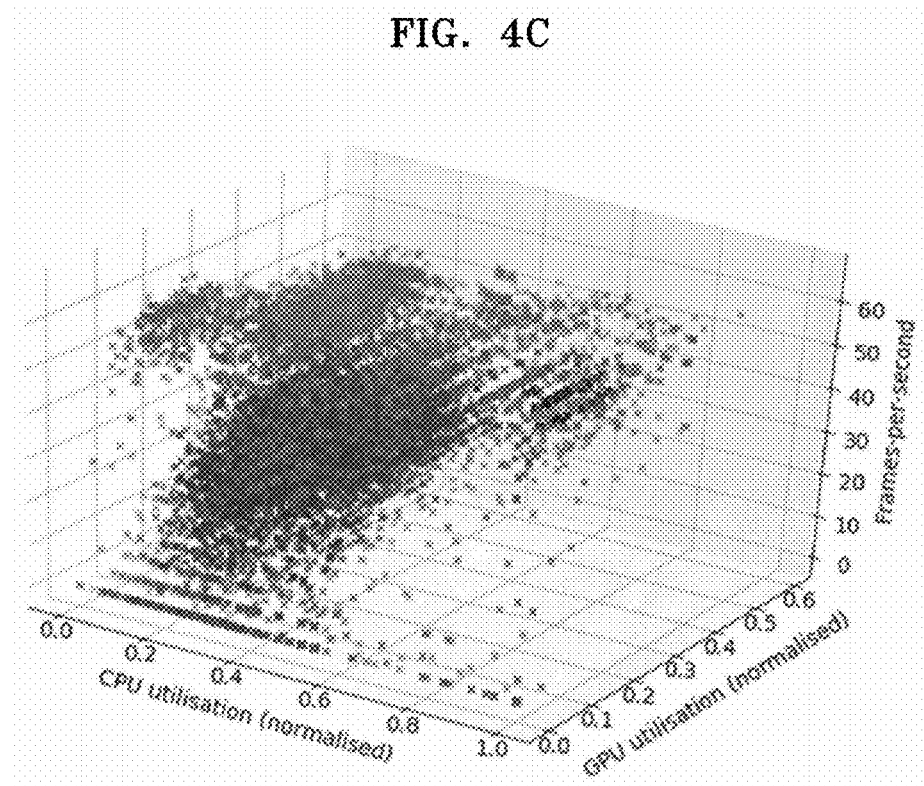

FIG. 4C graphically illustrates a clustering relationship among the three metrics described with reference to FIGS. 4A and 4B. In FIG. 4C, different shades represent three distinct scene clusters/workload types. The, metrics in the same cluster are more similar (e.g., in terms of variations or values) to each other than those in other clusters. Some shades may not belong to any of the three clusters.

Figure 4D:
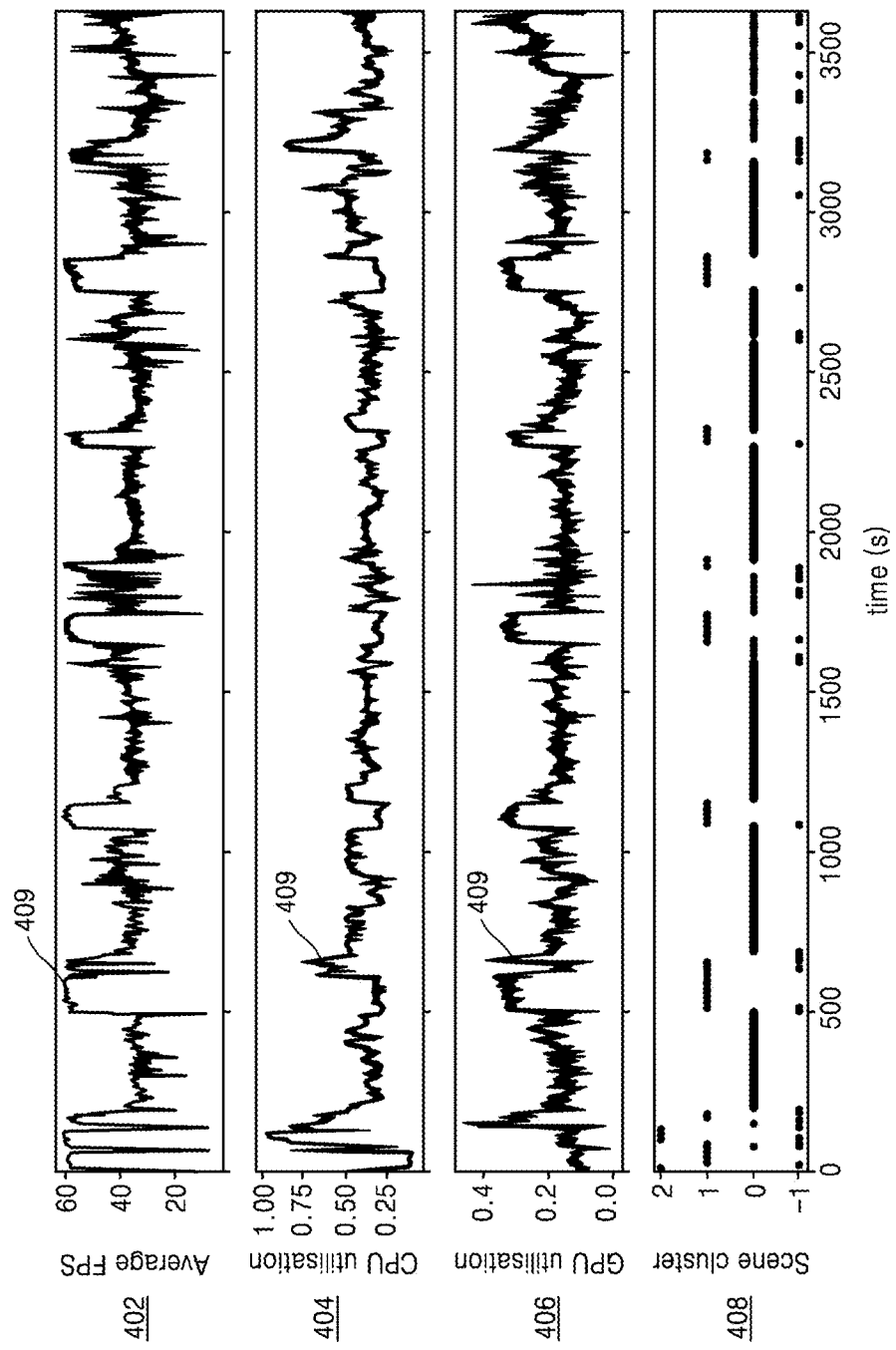

FIG. 4D illustrates a graph 408 and graphs 402, 404, and 406 showing three workload types (scene clusters) identified in the graph 408. Referring to FIG. 4D, the graph 408 shows the three identified workload types labeled −1, 1 and 2 on the y-axis. Some of the workloads produced by executing the software application 112, which do not correspond to any of the identified workload types, are shown as label 0.

Moreover, referring to FIG. 4D, workload types labeled 2 (e.g., corresponding to a specific scene change in the software application 112) are observed once during the 1-hour observation period, in which case the average FPS, CPU utilization, and GPU utilization metrics have corresponding high values during a relevant timeframe in the observation period. On the other hand, workload types labeled 1 (e.g., corresponding to a different specific scene change in the application) are observed a plurality of times during the 1-hour observation period, in which case the average FPS and GPU utilization metrics have corresponding high values and the CPU utilization metric has a lower value during a relevant timeframe in the observation period. The software 114 may use this information to identify different workload types produced during execution of the software application 112.

Figure 5A:
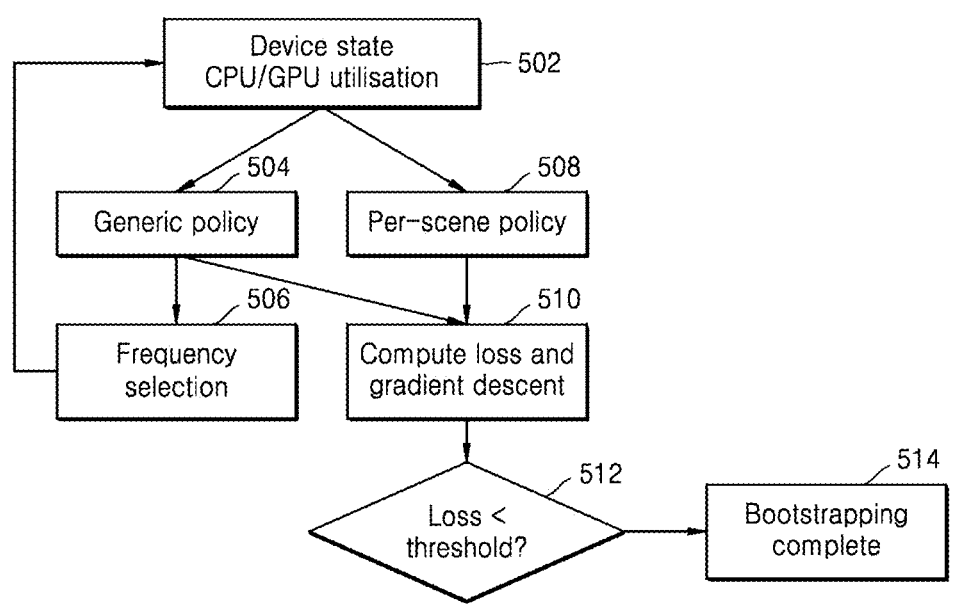
FIGS. 5A and 5B are flowcharts illustrating policy generation methods according to embodiments.
Figure 5B:
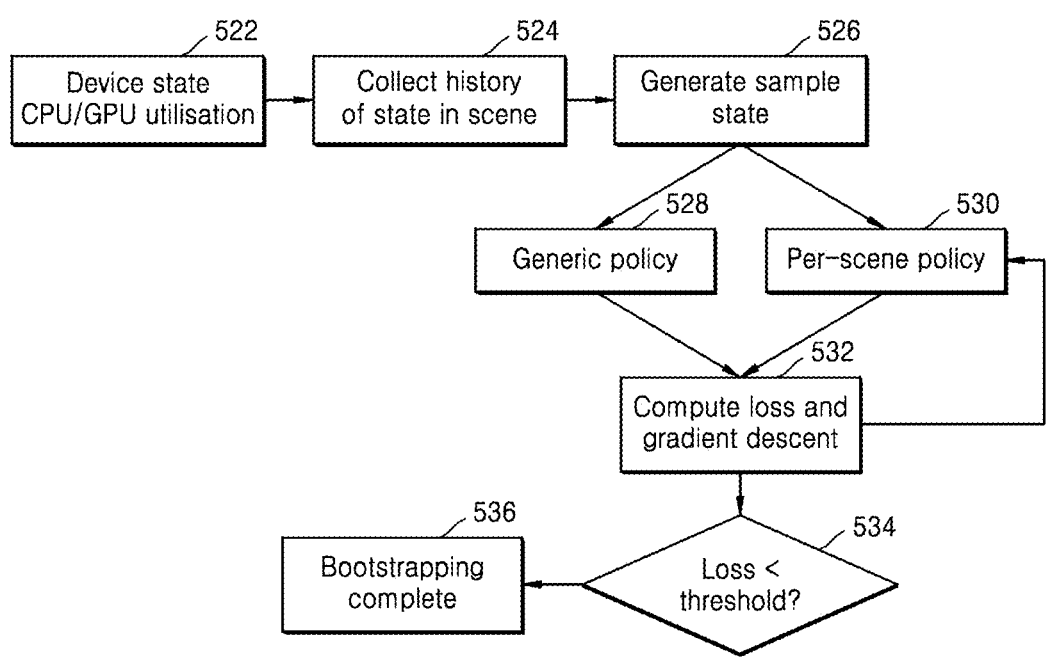

FIGS. 5A and 5B are flowcharts illustrating policy generation methods according to embodiments.

In detail, FIG. 5A illustrates an embodiment of operation 208 that is an initial policy generation operation performed by the software 114 based on a passive imitation learning technique while the software application 112 is being executed on the computer 100.

In operation 502, the software 114 may acquire data representing a current state of the computer 100. Although FIG. 5A shows CPU utilization and GPU utilization as data representing the current state, the data are merely an example, and may include various types of metrics.

Moreover, the software 114 may simultaneously or sequentially perform operations 504 and 508.

In operation 504, the software 114 may apply at least one rule in the generic policy 206. For example, in operation 506, a rule in the generic policy for selecting a specific operating frequency (i.e., operating system parameter) of the processor of the computer 100 based on the current CPU utilization and GPU utilization (i.e., device states) may be applied. For example, when the CPU utilization and GPU utilization both exceeds a measurement threshold, such as 80%, the operating frequency may be increased to a specific value, e.g., 2000 MHz. However, it will be fully understood by those of ordinary skill in the art that this is merely an example and various rules specifying a wide range of various operating system parameters and device states/metrics may be applied.

Furthermore, according to an embodiment, the process returns to operation 502 to measure an updated state of the computer, including changes made by any applied rule in the generic policy and perform operations 504 and 508 again.

In operation 508, when it is determined, based on data regarding the device states, that the computer 100 is currently experiencing one of the identified workload types, the software 114 may select at least one rule from an appropriate initial workload-specific policy.

In operation 510, the selected rule in the initial workload-specific policy (to be applied when the workload-specific policy is actually used during execution of the software application 112) may be compared with a rule in the generic policy which was actually applied in the current device state in operation 506. When the rule in the workload-specific policy is applied instead of the rule in the generic policy applied in operation 506 as a result of the comparison, a loss value may be produced which represents a degree to which performance of the computer 100 will be degraded (or "loss value=behavior to be imitated−behavior obtained from the workload-specific policy"). In an embodiment, the loss value may be the same as the "score" as will be described below with reference to FIG. 7. In operation 510, an optimization operation may be performed in operation 510 to reduce the loss value, thereby reducing a difference between the two policies. According to an embodiment, a gradient descent optimization technique may be used, but it will be fully understood by those of ordinary skill in the art that this is merely an example and other appropriate optimization techniques may be used.

In operation 512, the software 114 may compare the loss value representing the performance degradation with a specific threshold (e.g., a value determined by the developer) in order to determine whether the workload-specific policy is to be used. For example, when the loss value is less than the threshold, the workload-specific policy may be determined to be suitable for controlling the operating system parameters (or be output as the initial policy 210), and an initial policy generation process (or "bootstrapping") may be completed in operation 514. Otherwise, when the loss value is not less than the threshold, the workload-specific policy may be refined by repeating operations 508 and 510 so that the workload-specific policy may be combined with (or at least approach) the generic policy.

FIG. 5B illustrates an embodiment of operation 208 that is an initial policy generation operation performed by the software 114 based on an active imitation learning technique while the software application 112 is being executed on the computer 100.

In operation 522, the software 114 may acquire data representing a current state of the computer 100. Like in the embodiments described above, the data may include various types of metrics such as CPU utilization and GPU utilization.

The software 114 may determine whether the current state of the computer 100 corresponds to one of the identified workload types. In operation 524, the software 114 may acquire a set of data representing other states of the computer when the computer experienced the identified workload type. In operation 526, the software 114 may generate a state (which is the state of the computer and state of the software application), so that an appropriate policy may be applied for the generated state.

Policy rules that determine a threshold for increasing/decreasing the CPU operating frequency will now be described. According to an embodiment, the policy rules may be included in a part of a Dynamic Voltage and Frequency Scaling (DVFS) policy integrally-driven by using a power model term α.

$$\text{Up threshold} = \frac{\alpha(P_{f+1} - P_{f_0}) + \gamma}{f_{+1} - f_0} + \beta + \varepsilon \quad \text{Equation 1}$$

$$\text{Down threshold} = \frac{\alpha(P_{f-1} - P_{f_0}) + \gamma}{f_{-1} - f_0} + \beta \quad \text{Equation 2}$$

Moreover, the software 114 may simultaneously or sequentially perform operations 528 and 530. In operation 528, the software 114 may automatically produce an action based on a state-appropriate rule in the generic policy. In operation 530, the software 114 may automatically produce an action based on a state-appropriate learned rule in the workload-specific policy.

Furthermore, in operation 532, the actions produced in operations 528 and 530 may be compared with each other. When the rule in the workload-specific policy is applied instead of the rule in the generic policy applied in operation 528 as a result of the comparison, a loss value may be produced which represents a degree to which performance of the computer 100 will be degraded. The loss value may be 0 when both actions match. An optimization process may be used to reduce the loss value, thereby reducing a difference between the rules/performances of the two policies. According to an embodiment, a gradient descent optimization technique may be used, but it will be fully understood by those of ordinary skill in the art that this is merely an example and other appropriate optimization techniques may be used.

In operation 534, the software 114 may determine whether applying the workload-specific policy will result in unacceptable performance degradation. For example, the software 114 may determine whether the loss value is below a predetermined threshold (e.g., determined by the developer). When the loss value is less than the predetermined threshold, the workload-specific policy may be determined to be suitable for controlling the operating system parameters, and an initial policy generation process (bootstrapping) may be completed in operation 536 (e.g., by outputting the initial policies 210A, 210B, and 210C of FIG. 2). When the loss value is not less than the threshold, the workload-specific policy may continue to be refined by repeating at least one of the operations of FIG. 5B.

Figure 6:
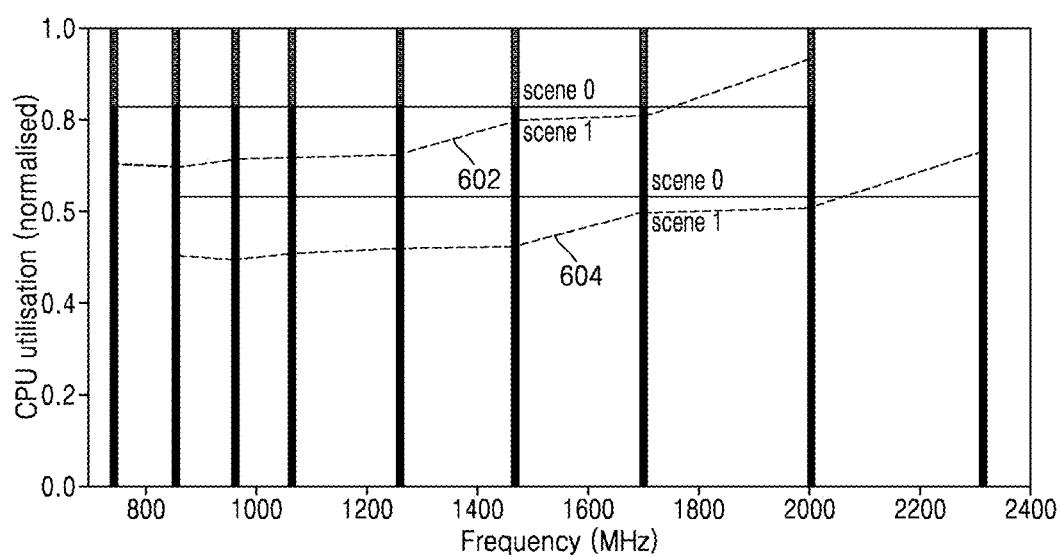
FIG. 6 is a graph illustrating a method of applying policies, according to an embodiment.

FIG. 6 is a graph illustrating a method of applying policies, according to an embodiment. In detail, FIG. 6 is a graph for explaining a method whereby workload-specific policies are trained to match a generic policy. According to an embodiment, different workload-specific policies shown by plot graphs 602 and 604 may be trained with respect to different workload types, e.g., scenes in a game application. For example, in FIG. 6, the y-axis and x-axis respectively represent CPU utilization and CPU operating frequency.

In FIG. 6, the upper plot graph 602 shows CPU utilization and operating frequency of the computer 100 as the computer 100 executes the software application 112 (e.g., Lineage 2 that is a game for the Android™ platform). Referring to FIG. 6, for example, when the computer 100 is in a state in which its CPU utilization is around 0.82 (82%), i.e., when the computer 100 encounters a specific scene change (from scene 0 to scene 1), a rule in a first workload-specific policy may allow the CPU operating frequency (operating system parameter) to increase from 1600 MHz to 2000 MHz.

The lower plot graph 604 in FIG. 6 shows CPU utilization and operating frequency of the computer 100 when the computer 100 executes the application 112 (e.g., Lineage 2 that is a game for the Android™ platform). According to an embodiment, when the computer 100 is in a state in which its CPU utilization is around 0.64 (64%), i.e., when the computer 100 encounters a specific scene change (from scene 0 to scene 1), a rule in a workload-specific policy may allow the CPU operating frequency (operating system parameter) to increase from 1700 MHz to 2300 MHz.

Figure 7:
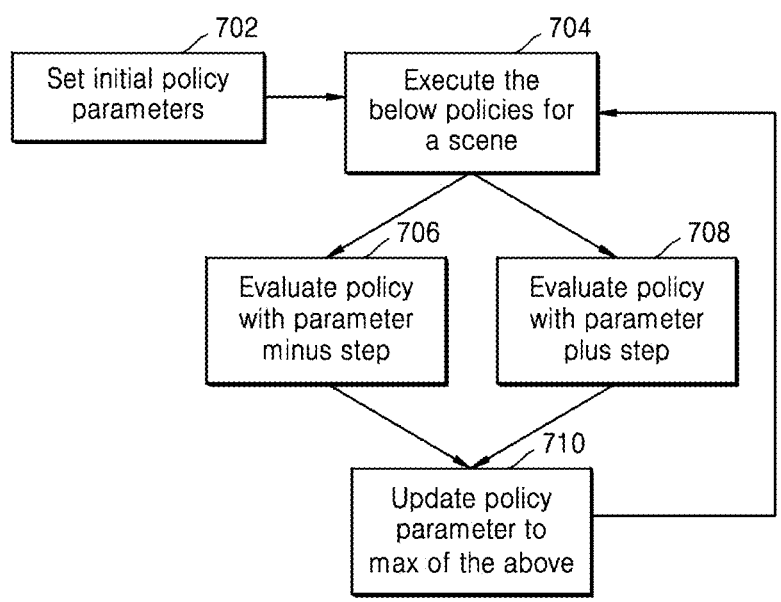
FIG. 7 is a flowchart of a policy iteration method according to an embodiment.

FIG. 7 is a flowchart illustrating a policy iteration method according to an embodiment. In detail, FIG. 7 illustrates an embodiment of operation 212 that is a workload-specific policy refinement operation performed by the software 114 while the software application 112 is being executed on the computer 100. While it is described in the present embodiment that a change of a policy is detected based on a policy iteration technique using a numerical gradient descent, it should be fully understood that this is merely an example and various optimization techniques, such as hill climbing, genetic algorithms, evolutionary algorithms, simulated annealing, etc., may be used in alternative embodiments.

In operation 702, the software 114 may set relevant operating system parameters according to a workload-specific policy based on a current state of the computer 100.

In operation 704, the software 114 may select the relevant workload-specific policy based on the current state of the computer 100, e.g., a workload type representing a change of scene in a game application.

The software 114 may simultaneously or sequentially execute operations 706 and 708. According to an embodiment, in operation 706, the software 114 may tune at least one parameter included in a rule of the selected workload-specific policy in a first manner, e.g., with a minus step. The software 114 may enhance the performance of the selected workload-specific policy by tuning the parameter. The parameter to be tuned in the rule may include a set operating system parameter or other variable values. Table 2 shows the first manner in which a parameter is tuned in an example policy.

TABLE 2

| Device State | Rule |
| --- | --- |
| CPU utilization >80%;<br>Operating frequency = 1000 MHz | If temperature >79° then change processor frequency Operating System parameter to 1500 MHz |

In operation 708, the software 114 may tune at least one parameter in a rule of the selected workload-specific policy in a second manner different from the first manner, e.g., by a plus step. The software 114 may enhance the performance of the selected workload-specific policy by tuning the parameter. In operation 708, a value by which the parameter is tuned may match a variation in operation 706 (e.g., +1 instead of −1), or the value may vary (e.g., +2 instead of −1). Table 3 shows the second manner in which a parameter is tuned in an example policy.

TABLE 3

| Device State | Rule |
| --- | --- |
| CPU utilization >80%;<br>Operating frequency = 1000 MHz | If temperature >81° then change processor frequency Operating System parameter to 1500 MHz |

A score function may be used to perform the policy refinement operation. An example composite score function for metrics observed during execution of a game application may be defined by Equation 3 below:

$$\text{score}=w_{afps}\text{afps}+w_{sfps}\text{sfps}+w_{aapt}\text{aapt} \qquad \text{Equation 3}$$

where:
afps—average frames-per-second over execution
sfps—stability of FPS least squares loss over windowed average)
aapt—exponential penalty function for APT (temperature)
$w_{afps}$—weight of average FPS score
$w_{sfps}$—weight of stability FPS score.
$w_{aapt}$—weight of average APT (temperature) score However, the score function defined in Equation 3 is an example, and those of ordinary skill in the art would fully appreciate that alternative metrics produced in different situations may be used for the score function according to the present disclosure.

In operation 710, the software 114 may update a result of tuning the parameter in the rule of the selected policy to a policy improved to have the highest/maximum/best score and output a refined workload-specific policy 214. Furthermore, the policy refinement method according to the present disclosure may return to operation 704 to be performed iteratively in order to further refine the policy.

Figure 8:
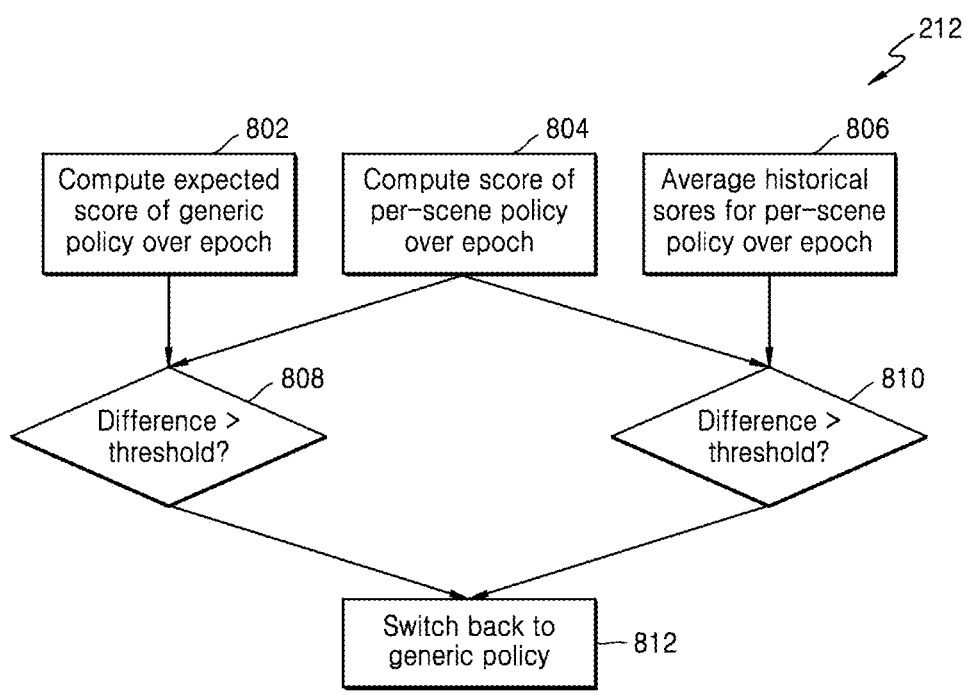
FIG. 8 is a flowchart illustrating a policy iteration supervision method according to an embodiment.

FIG. 8 is a flowchart illustrating a policy iteration supervision method according to an embodiment. In detail, FIG. 8 illustrates an embodiment of operation 212 that is a workload-specific policy refinement operation performed by the software 114 while the software application 112 is being executed on the computer 100. According to an embodiment, policy iteration may be performed optionally under supervision of the generic policy 206.

In operation 802, the software 114 may compute a score expected when applying the generic policy 206 while the software application 112 is being executed on the computer 100 over an epoch (e.g., determined by the developer).

In operation 804, the software 114 may compute a score expected when applying a relevant workload-specific policy 206 while the software application 112 is being executed on the computer 100 over the epoch.

In operation 806, the software 114 may obtain average historical scores when applying the workload-specific policy 206 while the software application 112 is being executed on the computer 100 over the epoch.

In operation 808, the software 114 may compare a difference between the score computed by applying the generic policy in operation 802 and the score computed by applying the workload-specific policy in operation 804. For example, the software 114 may determine whether the difference is greater than a threshold (e.g., determined by the developer). When it is determined, based on a result of the comparison, that applying the generic policy 206 exhibits better performance than applying the workload-specific policy, operation 812 may be performed to apply the generic policy 206 instead of the workload-specific policy during execution of the software application 112.

Furthermore, in operation 810, the software 114 may compare a difference between the score computed by applying the workload-specific policy in operation 804 and the average historical scores obtained when applying the workload-specific policy 206 in operation 806. For example, the software 114 may determine whether the difference is greater than a threshold (e.g., determined by the developer). When it is determined, based on a result of the comparison, that applying the generic policy 206 exhibits better performance than applying the workload-specific policy, operation 812 may be performed to apply the generic policy 206 instead of the workload-specific policy during execution of the software application 112.

Figure 9:
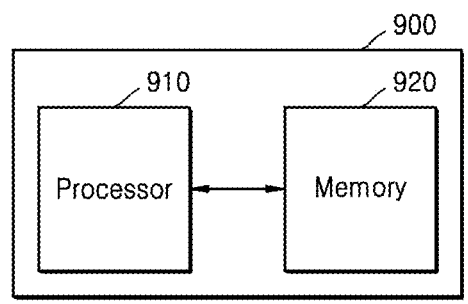
FIG. 9 is a block diagram of a device according to an embodiment.

FIG. 9 is a block diagram of a device 900 according to an embodiment. Referring to FIG. 9, the device 900 may include a processor 910 and a memory 920.

The processor 910 controls all operations of the device 900. The processor 910 may be configured to process at least one instruction by performing basic arithmetic, logic, and input/output operations. The instruction may be provided from the memory 920 to the processor 910. In other words, the processor 910 may be configured to execute the instruction according to a program code stored in a recording device such as the memory 920. Alternatively, the instruction may be received by the device 900 via a communication module (not shown) and provided to the processor 910.

The memory 920 may store applications executed on an operating system for operating the device 900 or the device 900. Furthermore, according to an embodiment, the memory 920 may store the at least one instruction that causes the processor 910 to set operating system parameters during execution of an application on the device 900.

The processor 910 may identify, based on execution of an application, at least one workload type for the application being executed. As described above, the workload type may be a characteristic event experienced by the device 900 while the application is being executed. A workload type may be defined in various ways according to the type and execution status of an application. For example, when the application is a game, a workload type may be a change in a specific scene or a menu window on s screen. The processor 910 may divide an application into at least one workload types so that more simplified policy may be applied.

In detail, the processor 910 may generate a workload-specific policy corresponding to the identified at least one workload type. Since the workload-type policy is generated to adapt to the identified workload type, the workload-type policy with a simpler structure than a generic policy may be used to improve the performance of the device while experiencing the workload type.

Moreover, the processor 910 may record at least one metric of the device while the application is being executed, and identify a workload type produced by executing the application based on the recorded at least one metric. For example, the processor 910 may record a plurality of metrics of the device, identify a correlation between at least two metrics of the plurality of metrics, and identify at least one workload type based on the identified correlation.

In this case, the processor 910 may identify a correlation between at least two metrics by comparing values of at least two metrics with a predetermined threshold for a specific time period. For example, when the values of the at least two metrics all exceed or fall below the predetermined threshold for the specific time period, the processor 910 may determine that the at least two metrics are correlated to each other. Alternatively, the processor 910 may record changes in values of at least two metrics for a specific time period, and compare the recorded changes with each other to identify a correlation between the at least two metrics. For example, when the changes in the values of at least two metrics show a similar tendency during the specific time period, the processor 910 may determine that the at least two metrics are correlated to each other.

In addition, as described with reference to FIG. 4D, the processor 910 may apply a filtering technique to the recorded at least one metric to more clearly record the at least one metric. By clustering the filtered at least one metric, the processor 910 may more clearly determine a correlation between the at least one metric as well as a workload type identified based on the correlation.

In an embodiment, the processor 910 may first set operating system parameters based on a generic policy while the identified at least one workload type is being executed. The generic policy may include at least one rule for setting an operating system parameter based on a current state of the device and may be valid for general use of the device. Because the generic policy is generated assuming the general use of the device, it may include rules for setting many operating system parameters.

The processor 910 may modify the generic policy to generate the modified generic policy. In an embodiment, the processor 910 may select a setting rule associated with the identified workload type from among setting rules included in the generic policy. The processor may generate a policy including only the selected setting rule as a modified generic policy. Alternatively, the processor 910 may generate, as a modified genetic policy, a policy developed by using passive or active imitation learning via observation of decisions made by the generic policy when the device experiences a particular software workload type.

The processor 910 may generate a workload-specific policy based on the modified generic policy. For example, the processor 910 may compare the performance of the device based on the modified generic policy with the performance of the device based on the generic policy, and when performance degradation is less than or equal to a threshold based on a result of the comparison, select the modified generic policy as a workload-specific policy. On the other hand, when the performance degradation exceeds the threshold, the processor 910 may discard the existing modified generic policy and restart the process from an operation of generating a new modified generic policy.

Furthermore, the processor 910 may refine the selected workload-specific policy after the workload-specific policy is selected. In an embodiment, the processor 910 may refine the workload-specific policy by modifying a value of a parameter set based on the workload-specific policy according to a plurality of predetermined tuning methods and adding the results together to reflect the most suitable modification method.

Examples of the device 900 may include, but are not limited to, a smartphone, a tablet personal computer (PC), a PC, a smart television (TV), a mobile phone, a personal digital assistant (PDA), a laptop, a media player, a micro server, a global positioning system (GPS) device, an electronic book terminal, a digital broadcasting terminal, a navigation terminal, a kiosk, a digital camera, a home appliance, and other mobile or non-mobile computing devices. Furthermore, the device 900 may be a wearable device such as a watch, glasses, a hair band, or a ring having a communication function and a data processing function.

Figure 10:
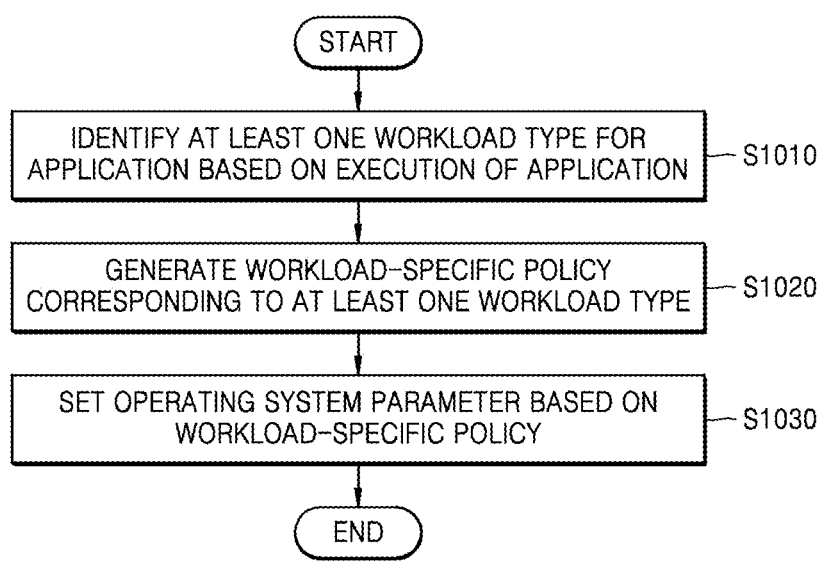
FIG. 10 is a flowchart illustrating a parameter setting method according to an embodiment.

FIG. 10 is a flowchart illustrating a parameter setting method according to an embodiment.

In operation S1010, a processor of a device may identify, based on execution of an application, at least one workload type for the application. For example, the processor may record at least one metric of the device while the application is being executed, and identify a workload type produced by executing the application based on the recorded at least one metric. For example, the processor may record a plurality of metrics of the device, identify a correlation between at least two metrics of the plurality of metrics, and identify at least one workload type based on the identified correlation.

In operation S1020, the processor may generate a workload-specific policy corresponding to the at least one workload type. According to an embodiment, the processor may first set operating system parameters based on a generic policy while the identified at least one workload type is being executed. The processor may modify the generic policy to generate the modified generic policy. In an embodiment, the processor may select a setting rule associated with the identified workload type from among setting rules included in the generic policy. The processor may generate a policy including only the selected setting rule as a modified generic policy. Alternatively, the processor may generate, as a modified genetic policy, a policy developed by using passive or active imitation learning via observation of decisions made by the generic policy when the device experiences a particular software workload type.

The processor may generate a workload-specific policy based on the modified generic policy. For example, the processor may compare the performance of the device based on the modified generic policy with the performance of the device based on the generic policy, and when performance degradation is less than or equal to a threshold based on a result of the comparison, select the modified generic policy as a workload-specific policy. On the other hand, when the performance degradation exceeds the threshold, the processor may discard the existing modified generic policy and restart the parameter setting process from an operation of generating a new modified generic policy.

Furthermore, the processor may refine the selected workload-specific policy after the workload-specific policy is selected. In an embodiment, the processor 910 may refine the workload-specific policy by modifying a value of a parameter set based on the workload-specific policy according to a plurality of predetermined tuning methods and adding the results together to reflect the most suitable modification method.

In operation S1030, the processor may set an operating system parameter based on the workload-specific policy.

According to an embodiment, for a specific application, manual input for tuning an operating system parameter may be useful compared to the automated policy-based setting methods described above. In other words, according to an embodiment, pre-training and/or hand tuning may be used in conjunction with on-device training. Human intervention due to the manual input may be used to assist the tuning process and verify results of the tuning process.

In this case, the training/tuning may be based on on-device (user device) use (e.g., more than 1 hour of training on device to achieve an optimal policy for a game, on-device (pre-commercialization) use (e.g., 1 to 10 hours of on-device training performed before deploying clustering and corresponding parameters pre-loaded into user devices), and/or hand-tuned operating system parameters (e.g., hand-clustering, hand-tuning of policies, training on user devices switched off, etc.).

Although the above-described embodiments have focused on operating system parameters available for power management, this is merely an example, and the methods of the present disclosure may be applied to various alternative embodiments in which operating system parameters may be set in relation to other types of system functions/operations, such as performance tuning, resolution tuning, refresh-rate tuning, hot-plugging cores, sleep-state control (depth of sleep decisions), scheduler/mapper, etc.

According to an embodiment, for software or physical control tasks, a complex task may also be divided into simpler sub-tasks. When the complex task is controlled by a generic static or dynamic policy, this policy may be used to bootstrap sub-task policies according to the bootstrapping method of the present disclosure. The sub-task policies may also be refined iteratively through policy search using the methods of the present disclosure.

The embodiments according to the present disclosure may provide advantages by dividing a software application into individual workload types. The methods of the present disclosure may create a policy for each individual workload type, which not only exhibits better performance than a generic policy but also has a simpler structure than the generic policy. Advantages of a simple policy are that a faster policy search is allowed and variance during the search is low. A faster policy search allows faster settings specific to each software workload, and may further limit the time during which the system needs to operate with reduced performance while exploratory refinements are being made to create a policy. Low variance during the search may reduce the level of performance degradation. These advantages of the present disclosure may be highly useful in terms of a production safety. For example, per-scene policies for each video game application may be trained on the device under production safeguards.

According to an embodiment of the present disclosure, a computer-readable medium having stored therein a computer program for performing the above-described method may be provided. The contents of all papers and documents that were filed concurrently with or prior to this specification in connection with the present disclosure and published and disclosed in this specification may be incorporated herein by reference.

The computer described in the present disclosure may be implemented using hardware components, software components, and/or a combination thereof. For example, the devices and their components illustrated in the embodiments of the disclosure may be implemented using one or more general-purpose or special-purpose computers, such as a processor, a controller, an arithmetic logic unit (ALU), a digital signal processor, a microcomputer, a field programmable array (FPA), a programmable logic unit (PLU), a microprocessor, or any other device capable of responding to and executing instructions.

While embodiments have been described with reference to the figures, it will be understood by those of ordinary skill in the art that various modifications and changes in form and details may be made from the above descriptions. For example, adequate effects may be achieved even if the above techniques are performed in a different order than that described above, and/or the aforementioned elements, such as systems, structures, devices, or circuits, are combined or coupled in different forms and modes than those described above or are replaced or supplemented by other components or their equivalents.

Thus, the scope of the disclosure should be defined not by the above-described embodiments of the disclosure but by the appended claims and their equivalents.

The invention claimed is:

1. A method of setting operating system parameters of a device, the method comprising:
identifying, based on execution of an application, at least one workload type for the application;
generating a workload-specific policy corresponding to the at least one workload type; and
setting the operating system parameters based on the workload-specific policy,
wherein the generating of the workload-specific policy comprises:
modifying a generic policy based on a setting rule associated with the at least one workload type among setting rules included in the generic policy prestored in correspondence with a general operation of the device, and
generating the workload-specific policy based on the modified generic policy.

2. The method of claim 1, wherein the identifying of the at least one workload type comprises:
recording at least one metric of the device while the application is being executed; and
identifying the at least one workload type based on the recorded at least one metric.

3. The method of claim 2,
wherein the recording of the at least one metric of the device comprises recording a plurality of metrics, and
wherein the identifying of the at least one workload type based on the recorded at least one metric comprises:
identifying a correlation between at least two metrics from among the plurality of metrics, and
identifying the at least one workload type based on the identified correlation.

4. The method of claim 3, wherein the identifying of the correlation between the at least two metrics comprises comparing values of the at least two metrics with a predetermined threshold for a specific time period.

5. The method of claim 3, wherein the identifying of the correlation between the at least two metrics comprises:
recording changes in values of the at least two metrics for a specific time period; and
comparing the recorded changes in the values with each other.

6. The method of claim 2, further comprising:
filtering the recorded at least one metric;
clustering the filtered at least one metric; and
identifying the at least one workload type based on the clustered at least one metric.

7. The method of claim 2, wherein the at least one metric of the device comprises:
at least one of average frames per second (FPS),
central processing unit (CPU) utilization, and
graphics processing unit (GPU) utilization.

8. The method of claim 1, wherein the generating of the workload-specific policy further comprises:
setting the operating system parameters based on the generic policy while the identified at least one workload type is being executed.

9. The method of claim 8, wherein the modifying of the generic policy comprises selecting some of the operating system parameters set based on the generic policy and selecting a policy for setting the selected parameters as a modified generic policy.

10. The method of claim 9, wherein the generating of the workload-specific policy comprises:
comparing performance of the device based on the modified generic policy with performance of the device based on the generic policy; and
selecting the modified generic policy as the workload-specific policy, based on a result of the comparing.

11. A device operating based on an operating system, the device comprising:
a memory storing one or more instructions and an application; and
a processor configured to execute the one or more instructions to:
identify, based on execution of the application, at least one workload type for the application,
generate a workload-specific policy corresponding to the at least one workload type,
set operating system parameters based on the workload-specific policy,
modify a generic policy based on a setting rule associated with the at least one workload type among setting rules included in the generic policy prestored in correspondence with a general operation of the device, and
generate the workload-specific policy based on the modified generic policy.

12. The device of claim 11, wherein the processor is further configured to execute the one or more instructions to:
record at least one metric of the device while the application is being executed; and
identify the at least one workload type based on the recorded at least one metric.

13. The device of claim 11, wherein the processor is further configured to execute the one or more instructions to:
set the operating system parameters based on the generic policy while the identified at least one workload type is being executed.

14. The device of claim 13, wherein the processor is further configured to execute the one or more instructions to:
select some of the operating system parameters set based on the generic policy; and
select a policy for setting the selected parameters as a modified generic policy.

15. The device of claim 14, wherein the processor is further configured to execute the one or more instructions to:
compare performance of the device based on the modified generic policy with performance of the device based on the generic policy; and
select the modified generic policy as the workload-specific policy, based on a result of the comparing.

* * * * *